United States Patent [19]

Osawa

[11] Patent Number: 4,886,374
[45] Date of Patent: Dec. 12, 1989

[54] LINEAR GUIDE APPARATUS

[75] Inventor: Nobuyuki Osawa, Takasaki, Japan

[73] Assignee: Nippon Seiko Kabushiki Kaisha, Tokyo, Japan

[21] Appl. No.: 269,673

[22] Filed: Nov. 10, 1988

[30] Foreign Application Priority Data

Nov. 18, 1987 [JP] Japan .................... 62-176183[U]

[51] Int. Cl.⁴ .............................................. F16C 29/06
[52] U.S. Cl. ........................................ 384/13; 384/45
[58] Field of Search ................... 384/13, 45, 43, 44; 464/168

[56] References Cited

U.S. PATENT DOCUMENTS

| | | | |
|---|---|---|---|
| 4,253,709 | 3/1981 | Teramachi | 384/45 |
| 4,420,193 | 12/1983 | Teramachi | 384/45 |
| 4,472,003 | 9/1984 | Osawa | 384/45 |
| 4,610,488 | 9/1986 | Geka | 384/45 |
| 4,616,886 | 10/1986 | Teramachi | 384/45 |
| 4,773,770 | 9/1988 | Osawa et al. | 384/45 |

FOREIGN PATENT DOCUMENTS 63-29940  8/1988  Japan .

Primary Examiner—Lenard A. Footland
Assistant Examiner—Lewis Jay Schleider
Attorney, Agent, or Firm—Basile and Hanlon

[57] ABSTRACT

A linear guide apparatus includes a guide rail and a slider mounted on the guide rail movable in the axial direction through balls interposed between corresponding ball rolling grooves of the guide rail and the slider. End caps are joined to opposite ends of the slider, and each of the end caps has a ball circulating path formed therein to connect the ball rolling grooves of the guide rail and the slider to ball rolling paths formed in the slider. An oil feed groove is formed in the end cap, and lubricating oil is normally supplied to the ball circulating path from an oil feed nipple attached to the front of the end cap through the oil feed groove. A blind hole for mounting the oil feed nipple is formed in the side of the end cap as a spare oil feed hole at the time of molding of the end cap so that the bottom of the blind hole is located close to the oil feed groove. When it is necessary to change the position of the oil feed nipple from the front to the side of the end cap, the bottom portion of the blind hole is easily opened to connect the blind hole to the oil feed groove.

1 Claim, 3 Drawing Sheets

LINEAR GUIDE APPARATUS

BACKGROUND OF THE INVENTION

1. Field of the Invention

The present invention relates to a linear guide apparatus having circulating paths for rolling members interposed between a guide rail and a slider movable on the guide rail, and in particular, to a linear guide apparatus having a feeding position for lubricating oil supplied to circulating paths for rolling members.

2. Description of the Relevant Art

A linear guide apparatus of this type is disclosed, for example, in Japanese Utility Model Laid-Open Publication No. 58-155426.

The linear guide apparatus comprises a long guide rail having rolling grooves formed in both sides for balls which are rolling members, and a slider main body mounted on the guide rail in a movable, straddling relationship thereto and having ball rolling grooves respectively corresponding to the ball rolling grooves of the guide rail. The slider main body further has through holes as ball paths extending in the axial direction in parallel to the ball rolling grooves. End caps are respectively fixed to opposite ends of the slider main body, and each of the end caps has a pair of ball circulating paths, having a half-doughnut shape, formed as recesses, respectively extending between the ball rolling grooves of the slider main body and corresponding through holes. An oil feed groove is connected to the ball circulating paths. Balls are inserted rollably in the ball rolling grooves and through holes of the guide rail and the slider main body, and in the half-doughnut shaped ball circulating paths.

When the slider moves relative to the guide rail in the axial direction, the balls roll and circulate through the through holes, the ball circulating paths, and the ball rolling grooves, allowing the slider to move smoothly in the axial direction due to the rolling of the balls. In this case, a lubricant is supplied to the ball circulating paths through the oil feed groove. By virtue of this, the smooth rolling of the balls can be assured.

The lubricant is generally supplied to the oil feed groove through an oil feed member such as an oil feed nipple screwed into a threaded hole formed in the front surface of the end cap. However, when the oil feed nipple located on the front surface of the end cap interferes with a stopper provided at the end of the guide rail, or interferes with a member to be mounted on the slider, the location of the oil feed nipple must be changed to the side of the slider. When such a need occurs, in the prior art, as shown in FIG. 6, a female threaded hole G is formed, by machining, in the side of the slider main body A and at the same time, an oil passage C is formed, by machining, in the slider main body A, which is typically made of metal, so that the female threaded hole G is brought in communication with the oil feed groove of the end cap. For this reason, a problem is involved in that the cost is increased due to the machining, and furthermore, it is difficult to quickly change the location of the grease nipple when such a request occurs. Moreover, since machining is required, metallic chips remaining in the oil passage are apt to be transported into the ball circulating paths together with the lubricant.

As a countermeasure to such a problem, it has been proposed, as shown in FIG. 7, to form oil passages D beforehand at three positions on the front face and side faces of an end cap F manufactured by plastic injection molding, and subsequently closing two of the three oil passages using blind plugs. However, time is required to screw the blind plugs into the oil passages resulting in high costs.

SUMMARY OF THE INVENTION

It is an object of the invention to provide a linear guide apparatus which is manufactured at low cost in which the oil feed position can be changed easily and quickly when needed.

In order to achieve the above object, a linear guide apparatus in accordance with the invention comprises a guide rail extending in an axial direction having axially extending rolling member rolling grooves formed in both sides, a slider mounted on the guide rail, in a movable relationship thereto, having rolling member rolling grooves respectively corresponding to the rolling member rolling grooves of the guide rail formed in inner surfaces of both side walls, through holes as rolling member paths formed respectively in the side walls of the slider, in parallel to the rolling member rolling grooves, end caps joined to opposite ends of the slider main body, each having a pair of rolling member circulating paths curved in a semicircular shape for respectively bringing the rolling member paths in communication with the rolling member rolling grooves, each of the end caps further having an oil feed groove for supplying oil to the rolling member circulating paths, and rolling members inserted rollably into the opposing rolling member rolling grooves of the guide rail and the slider, and into the rolling member paths and the rolling member circulating paths. A blind hole, for mounting an oil feed member, is formed in one side of each of the end caps so that the bottom of the blind hole approaches the oil feed groove. The hole bottom is adapted to be removed, if necessary, to bring the blind hole in communication with the oil feed groove.

The blind hole for mounting the oil feed member, located at one side of the end cap, is formed when the end cap is molded. Accordingly, the manufacturing cost is not increased particularly. Furthermore, the hole at the side of the end cap, which has relatively little chance of being used, is formed as a blind hole. As a result, no foreign particles enter, and a blind plug is not necessary. When it becomes necessary to change the position of the oil feed member attached to the front portion of the end cap, it is only required to open the hole bottom of the blind hole to form a through hole to the oil feed groove, and to screw the oil feed member into an internal thread. In this case, since the bottom of the blind hole is formed to approach the oil feed groove, the opening of the hole bottom can be formed easily as, for example, with a light tap, without particular machining. However, when the blind hole is formed as a starting hole having internal threads for attaching the oil feed member, it is necessary to machine the internal threads additionally and it is machined with a tap so that no chip remains.

BRIEF DESCRIPTION OF THE DRAWINGS

FIGS. 1 to 5 show main parts of an embodiment of the invention, in which:

FIG. 1 is a plan view, partially in section, of a linear guide apparatus;

FIG. 2 is a front view of the linear guide apparatus of FIG. 1 with the right half of the end cap removed;

FIG. 3 is a rear view of the end cap;

FIG. 4 is a side view of the end cap as viewed in the direction of arrow IV in FIG. 3;

FIG. 5 is a sectional view taken along the line V—V in FIG. 4;

DESCRIPTION OF THE PREFERRED EMBODIMENTS

Figure 1:
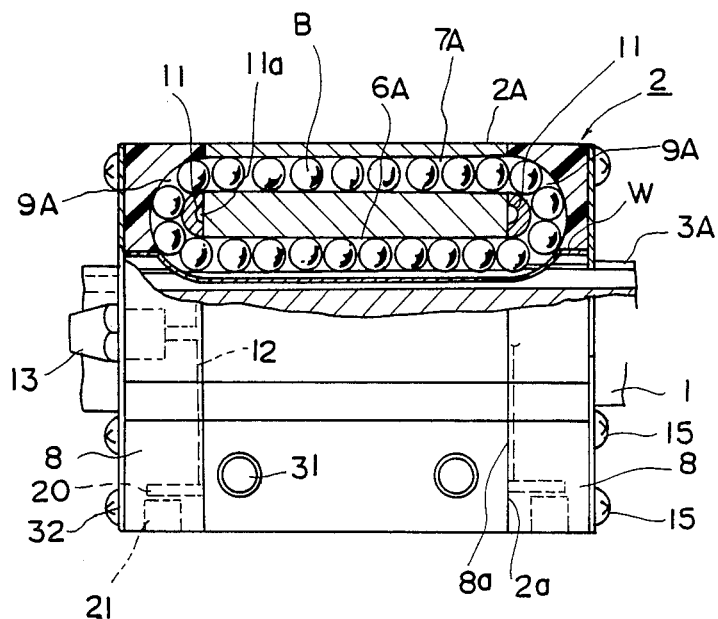
Figure 2:
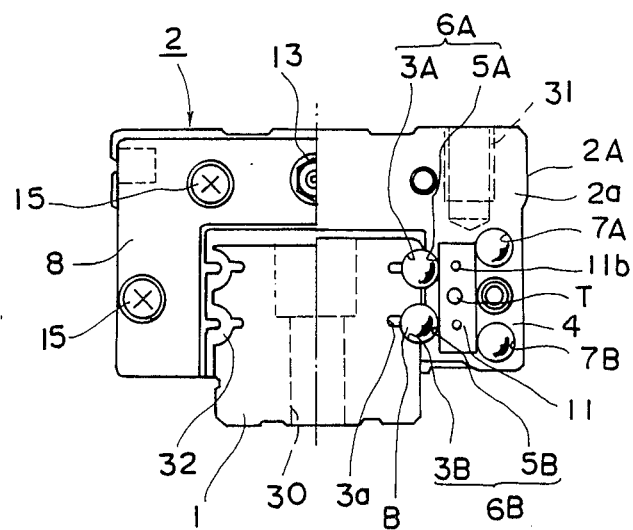
Figure 3:
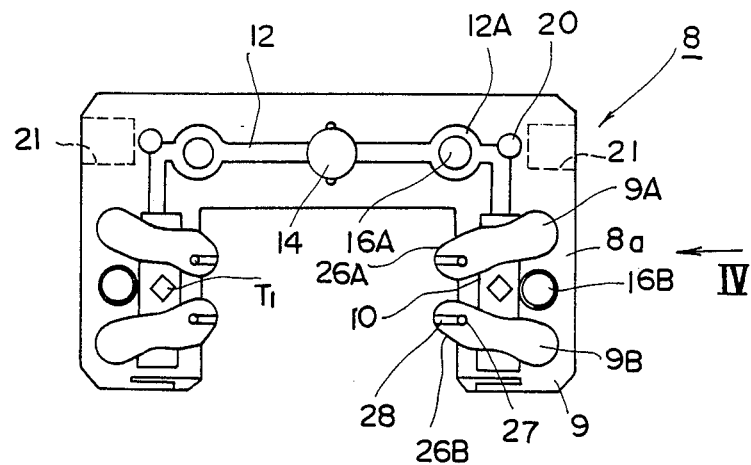

In FIGS. 1 to 5, a slider 2 having an inverted U-shaped cross section is movably mounted on a guide rail 1. The guide rail 1 has two ball rolling grooves 3A and 3B formed in each side surface. The axially extending grooves 3A and 3B have a semicircular cross section and are aligned vertically with respect to each other. Each of the ball rolling grooves 3A and 3B has an axially extending escape groove 3a formed in the bottom surface for insertion of a wire-formed retainer W which prevents balls B from falling off slider 2.

Slider 2 has ball rolling grooves 5A and 5B formed in the inner surface of each side wall 4 of a slider main body 2A so that the ball rolling grooves 5A and 5B respectively oppose the ball rolling grooves 3A and 3B. The pairs of the opposing ball rolling grooves 3A and 5A, and 3B and 5B respectively constitute ball rolling paths 6A and 6B. Additionally, each of the side walls 4 of the slider main body 2A has a ball path 7A having a circular cross section penetrating axially in parallel to the ball rolling path 6A, and a ball path 7B in parallel to the ball rolling path 6B.

End caps 8 are joined by bolts 15 respectively to opposite ends of the slider main body 2A. The end cap 8 is a product of injection molding of a synthetic resin material, and has an inverted U-shaped cross section similar to the slider main body 2A. Each of leg portions 9 of the end cap 8 has a pair of semicircular ball circulating paths 9A and 9B formed in the end face 8a of end cap 8 which opposes end face 2a of the slider main body 2A. The ball circulating path 9A brings the ball rolling path 6A into communication with the ball path 7A, and the ball circulating path 9B brings the ball rolling path 6B into communication with the ball path 7B.

Each of the leg portions 9 has a half-cylindrical recess 10 extending vertically to cross the central portions of the semicircular ball circulating paths 9A and 9B. A hollow half-cylindrical return guide 11 is secured to the end face 2a of the slider main body 2A to extend vertically at a position corresponding to the half-cylindrical recess 10. The inner surface of the hollow half-cylindrical return guide 11 defines an oil passage groove 11a, and a through hole 11b is formed between the inner surface and the outer surface of the return guide 11. Thus, when the end face 8a of the end cap 8 is joined to the end face 2a of the slider main body 2A, the return guide 11 is fitted into the cylindrical recess 10, and the ball circulating paths 9A and 9B are formed in a half-doughnut shape. In this case, a cylindrical protrusion T formed on the outer surface of the return guide 11 is securely fitted into a square hole T1 formed in the bottom surface of the cylindrical recess 10 in a relationship so that no looseness is produced.

In the end face 8a of the end cap 8, there is formed an oil feed groove 12 corresponding to the shape of the end cap 8. The oil feed groove 12 brings both cylindrical recesses 10 of both leg portions 9 of the end cap 8 into communication with each other. The oil feed groove 12 is in communication with a through hole 14, formed in end cap 8, for fixing an oil feed nipple 13 provided on the front side of the end cap 8. Furthermore, the end cap 8 is formed with through holes 16A and 16B for fixing bolts 15 to attach the end cap 8 to the slider main body 2A. Through hole 16A which penetrates the oil feed groove 12 is provided with a spot facing to form an annular oil feed groove 12A so as to enable lubricant to be passed around screw 15.

Additionally, oil feed holes 20 are formed at both shoulder portions of the inverted U-shaped oil feed groove 12. The feed holes 20 extend axially inwardly, from the end face 8a, into the end cap 8, and the oil feed holes 20 form a part of the oil feed groove 12.

Blind holes 21 are formed at both sides of the end cap 8, extending inwardly in a direction orthogonal to the oil feed holes 20, and are used for attaching spare oil feed members. Although the bottom portion of the blind hole 21 is very close to the oil feed hole 20, these holes are not in fluid communication with each other. Specifically, with reference to FIG. 5, the inner wall of the blind hole 21 is formed with a female thread 22 configured to mate with a male thread of an oil feed nipple 13. A bite-off groove 23 having a notched circular portion is formed in the bottom of the blind hole 21. In addition, a knob 24 configured as a flat plate is formed in the inside of the circular bite-off groove 23 extending outwardly. The blind holes 21 are formed at the time of injection molding of the end cap 8.

Figure 4:
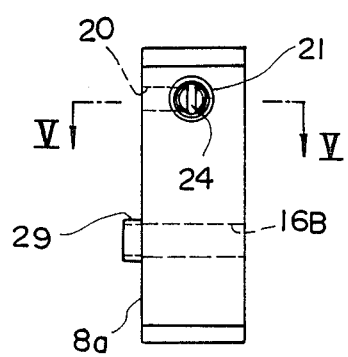
Figure 5:
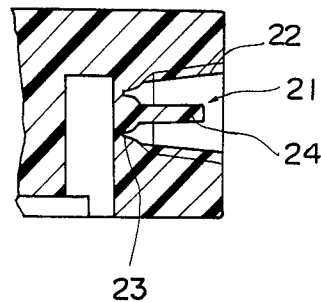
Figure 6:
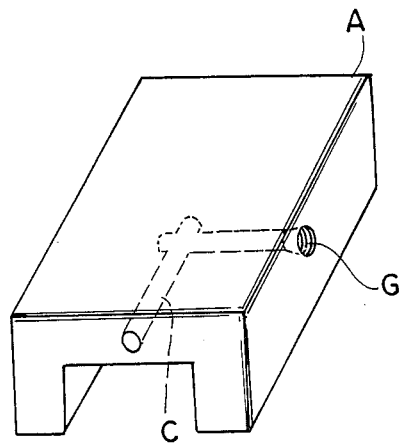
FIG. 6 is a perspective view of a slider, of a linear guide apparatus, for explaining an example of the manner of changing the position of oil feeding in a prior art linear guide apparatus.
Figure 7:
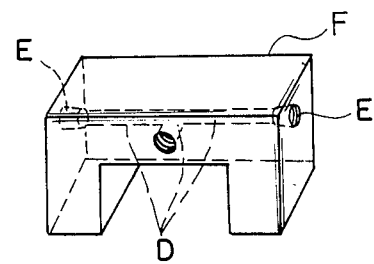
FIG. 7 is a perspective view of an end cap of a linear guide apparatus for explaining another example of the manner of changing the position of oil feeding in a prior art linear guide apparatus.

The ball circulating grooves 9A and 9B have ball scooping protrusions 26A and 26B formed respectively at inner end portions to protrude in a semicircular shape so that the ball scooping protrusions 26A and 26B respectively fit into the ball rolling grooves 3A and 3B of the guide rail 1. A wire holding hole 27 and wire escape groove 28 are formed in each of the ball scooping protrusions 26A and 26B. Further, a guide protrusion 29, shown in FIG. 4, is formed in end face 8a for ease of attaching the end cap 8 to the slider main body 2A.

A multiplicity of balls B are inserted in the resulting infinitely circulating route constituted by the ball rolling path 6A, the ball circulating path 9A, and the ball path 7A, and additionally in the infinitely circulating route constituted by the ball rolling path 6B, the ball circulating path 9B, and the ball path 7B.

Reference numeral 30 designates a through hole for inserting a bolt to fix the guide rail 1 to a base (not shown) or the like when the linear guide apparatus is to be used. Reference numeral 31 designates a threaded hole for a bolt to fix a member such as a table or the like to the slider 2. Furthermore, numeral 32 designates a wiper seal made of synthetic rubber attached to the end cap 8 for wiping the ball rolling grooves 3A and 3B, and the surface of the guide rail 1 to prevent intrusion of foreign particles.

In operation, the end cap 8 is attached to the slider main body 2A by joining the end face 8a to the end face 2a of the slider main body 2A, using bolts 15 inserted into the through holes 16A and 16B. Normally, a lubricating oil is supplied into the oil feed groove 12 from the oil nipple 13 attached to the front of the end cap 8.

When the slider 2, mounted on the guide rail 1, is moved in the axial direction, the balls B inserted in the ball rolling path 6A (6B) roll with the movement of the slider. The direction of ball movement, relative to the slider 2, is in the opposite direction to the slider 2. When the balls B reach the end portion of the slider 2, the balls B are introduced, by the ball scooping protrusion 26A (26B), into the ball circulating path 9A (9B) thereby changing direction and entering ball path 7A (7B). Subsequently, the balls B pass through the ball path 7A (7B), and again make a U-turn in the ball circulating path 9A (9B) in the opposite end cap 8 to return to the ball rolling path 6A (6B). In this manner, the balls B continue to roll and repeat the circulation.

At this time, the lubricating oil in the oil feed groove 12 is supplied to the ball circulating paths 9A and 9B through the oil passage groove 11a and the through hole 11b of the return guide 11 to assist the smooth rolling of the balls B.

When the oil feed nipple 13 at the front of the end cap 8 interferes with other members, the nipple 13 may be moved to the side of the end cap 8. In this case, the bottom portion of the blind hole 21, corresponding to the bite-off groove 23, is twisted and removed by pinching the knob portion 24 with a pliers or cutting pliers and pulling and removing that portion. As a result, the blind hole 21 is brought into communication with the oil feed groove 12 through the oil feed hole 20. Accordingly, by making the oil feed nipple 13 engage the female thread 22, it becomes possible to smoothly supply the lubricant. The hole for the oil feed nipple 13 at the front of the end cap 8 is closed using a blind plug.

In this embodiment, the blind holes 21 and the oil feed holes 20 located at both sides of the end cap 8 are formed at the time of injection molding of the end cap 8. As such, even when these spare oil feeding structures are added, the cost is not particularly increased. Moreover, it is possible to dispense with the man-hours required for forming a long hole in the slider main body 2A which is made of metal and requires machining as in the prior art, or for closing the two out of the three oil feed holes formed beforehand, using blind plugs, in order to prevent foreign particles from intruding.

Normally, the end cap 8 is delivered with the oil feed nipple 13 attached to the front of the end cap 8, however, when it is not suitable to supply oil from the front of the end cap 8, the blind hole 21 can be easily connected to the oil feed groove 12 by only twisting the bottom portion of the blind hole 21. Furthermore, in this embodiment, since the female thread 22 has already been formed for engaging with the oil feed nipple 13, no machining is required for changing the regular oil feed position to a spare oil feeding position, and the change of the oil feed position can be achieved in a short time.

In this embodiment, while the linear guide apparatus is described for a standard case, if it is intended from the beginning to attach the grease nipple 13 at the side of the end cap 8, each hole for attaching the grease nipple 13 is formed as a blind hole, and the particular hole to be used to attach the grease nipple may be made to connect with the oil feed groove 12 as required.

Alternatively, the female thread 22 of the blind hole 21 is not formed by injection molding, but only its starting hole is formed, and the female thread 22 may be formed by subsequent additional machining when needed. This structure is simple to mold, however, chips produced in machining the female thread are apt to enter the oil feed path which is not desirable. Therefore, for such an embodiment, it is preferable to remove the end cap 8 from the slider main body 2A at the time of changing the position of oil feeding, and to perform machining of the female thread and cleaning of the machined end cap 8 to remove the chips.

When the bite-off groove 23 and the knob portion 24 are not formed at the bottom of the blind hole 21, and it is desired to connect the blind hole 21 to the oil feed groove 12, it is possible to bore by drilling, or by melting the bottom portion of the blind hole 21 with a heated metallic bar or the like.

In the embodiment described above, the linear guide apparatus uses the balls as rolling members. However, the application of the present invention is not limited to this, and the invention is naturally applicable to a linear guide apparatus using rollers as the rolling members, and to other mechanical elements, components, etc.

As described in the foregoing, in the present invention, a blind hole is formed in the side of the end cap as a spare oil feed hole at the time of molding the end cap. When it is needed, the bottom of the blind hole which is formed close to the oil feed groove is removed to bring the blind hole into communication with the oil feed groove. By virtue of this, it is not necessary to perform machining of a hole and corresponding threads for attaching the oil feed nipple, and it is possible to adapt the end cap quickly and easily at low cost for the change of the oil feed position.

While certain embodiments of the invention have been described in detail above in relation to linear guide apparatus, it will be apparent to those skilled in the art that the disclosed embodiment may be modified. Therefore, the foregoing description is to be considered exemplary rather than limiting, and the true scope of the invention is that defined in the following claims.

I claim:

1. In a linear guide apparatus comprising a guide rail extending in an axial direction and having axially extending rolling member rolling grooves formed in both sides, a slider main body mounted on said guide rail, and axially movable with respect to said guide rail, having rolling member rolling grooves formed in inner surfaces of both side walls respectively corresponding to the rolling member rolling grooves of said guide rail, and having through holes, as rolling member paths, formed respectively in the side walls in parallel to the rolling member rolling grooves of said side walls, end caps joined to opposite ends of said a slider main body, each of said end caps having a pair of rolling member circulating paths curved in a semicircular shape for respectively bringing the rolling member paths in communication with the rolling member rolling grooves, further having an oil feed groove for supplying oil to the rolling member circulating paths, and rolling members inserted rollably into the opposing rolling member rolling grooves of said guide rail and said slider main body, and into the rolling member paths and the rolling member circulating paths, wherein an improvement comprises:

a blind hole, for mounting an oil feed member, formed in a side of each of the end caps, the bottom of said blind hole located close to said oil feed groove, and said hole bottom adapted to be removed, if necessary, to bring said blind hole in communication with said oil feed groove.

* * * * *